United States Patent [19]
Thompson

[11] 3,834,433
[45] Sept. 10, 1974

[54] CARTRIDGE-ACTUATED DEVICE FOR INFLATING TIRES AND THE LIKE

[76] Inventor: Arnold M. Thompson, Box 1722 Gary Ave., Wheaton, Ill. 60090

[22] Filed: Nov. 22, 1971

[21] Appl. No.: 201,051

[52] U.S. Cl.................. 141/392, 141/19, 152/415
[51] Int. Cl............................................ B60c 23/00
[58] Field of Search............ 141/2, 3, 4, 18, 19, 38, 141/311, 312, 319, 329, 330, 363, 364, 392; 222/5; 152/415; 137/68, 71, 231

[56] References Cited
UNITED STATES PATENTS

| | | | |
|---|---|---|---|
| 2,498,596 | 2/1950 | Wallach............................ | 141/38 X |
| 2,717,720 | 9/1955 | Nissen................................ | 141/19 |
| 2,812,783 | 11/1957 | Bufogle.............................. | 141/38 |
| 3,061,148 | 10/1962 | Knapp................................ | 141/19 |
| 3,448,779 | 6/1969 | Horwitt............................ | 141/384 X |

Primary Examiner—Houston S. Bell, Jr.
Assistant Examiner—Frederick R. Schmidt
Attorney, Agent, or Firm—Norman H. Gerlach

[57] ABSTRACT

A small cartridge-actuated device adapted to inflate tires and other articles and embodying a sealed container in which a removable $CO_2$ type cartridge is punctured by an impact plunger at one end of the container to thus fill the container with pressurized gas which may be applied to the valve stem of a tire by a valve-equipped fitting at the other end of the container.

2 Claims, 3 Drawing Figures

PATENTED SEP 10 1974  3,834,433
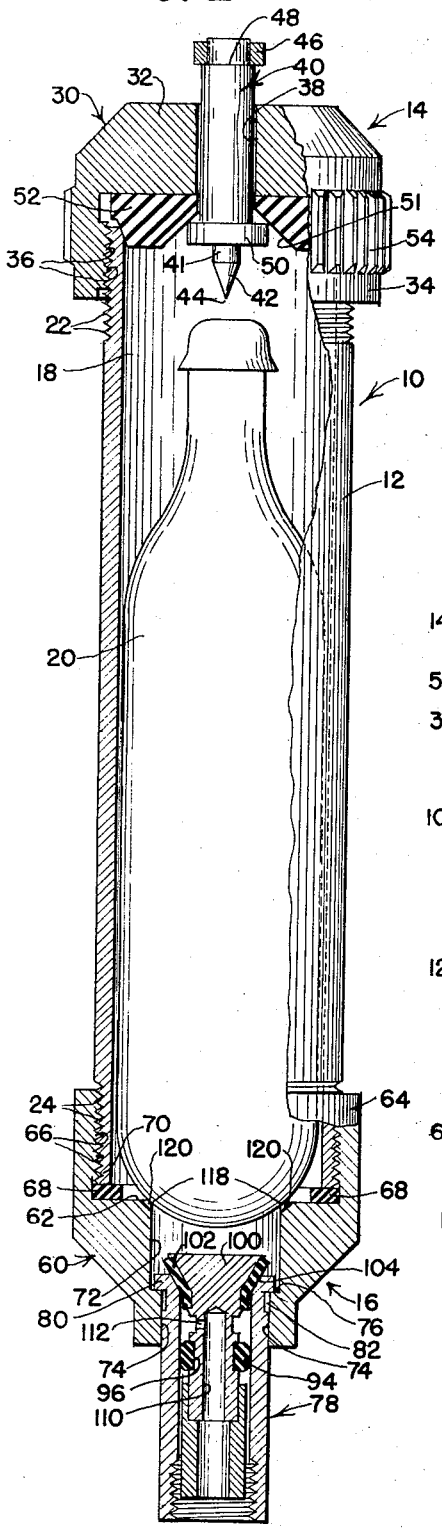
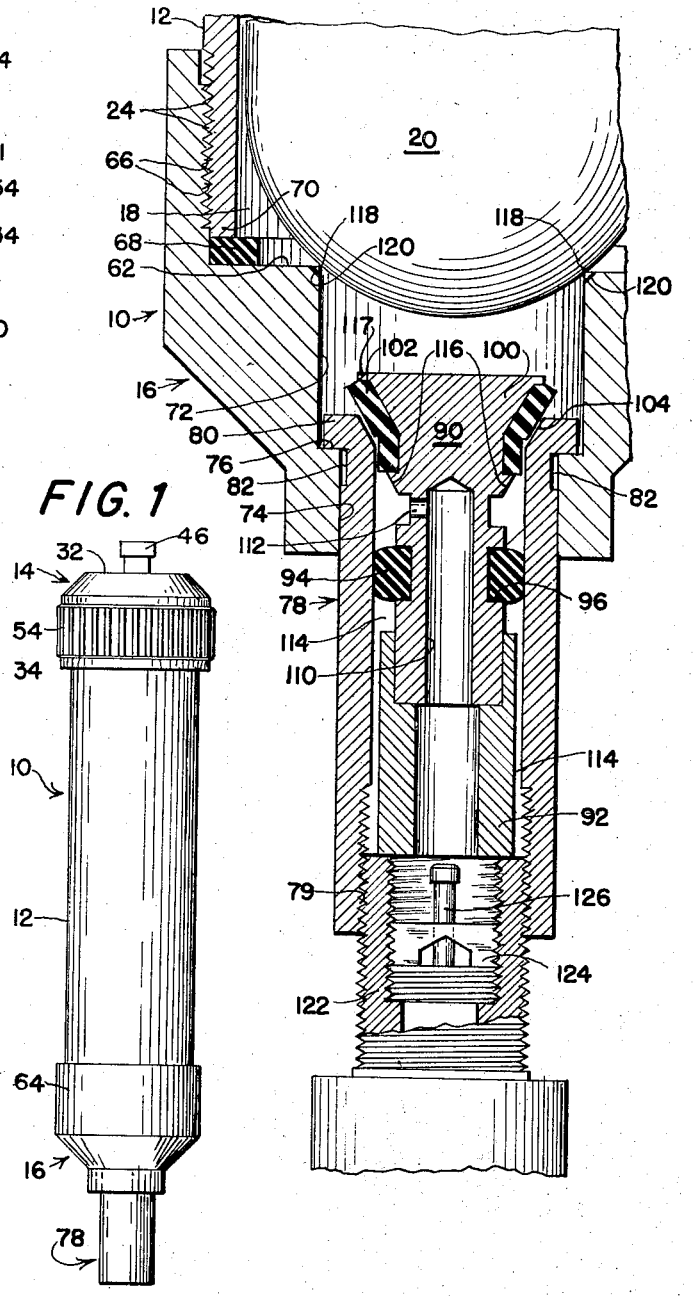
INVENTOR
ARNOLD M. THOMPSON
By: Norman Gerlach
Atty.

CARTRIDGE-ACTUATED DEVICE FOR INFLATING TIRES AND THE LIKE

The present invention relates generally to an inflation device which is of such size that it may be readily carried in a pocket of the user and by means of which the tires of bicycles, go-carts, motorcycles, or small airplanes and automobiles may be inflated while on their associated wheels. The device is also capable when provided with a needle-type attachment of inflating certain toys as well as hollow balls such as footballs and the like. More specifically, the invention is concerned with that type of device in which the pressurized gas which is employed for inflation purposes is derived from a conventional $CO_2$ type of cartridge which is commonly available in sporting goods stores, hardware stores, and the like and is used in connection with air rifles, etc. for discharging carbon dioxide gas under pressure into gas compartments.

Inflation devices of the general character outlined above are possessed of certain limitations, principal among which is the fact that they are designed for "one shot" or single use application, which is to say that once the soft metal seal of the cartridge has been punctured, the contents ($CO_2$ under pressure) of the cartridge must be used to completion and no provision is made for storing an unused portion of the pressurized gas for subsequent use in connection with the inflation of a succeeding tire, inner tube, or other article. Despite the fact that the pressurized volume of gas in a conventional $CO_2$ type cartridge is sufficient for the inflation of a single average size bicycle tire, it frequently is desired to use such a tire inflation device to supply replacement air to tires which have become deflated only a few pounds below their rated or optimum pressure. In such instances, the use of known tire inflation devices of the cartridge type is obviously wasteful since after a small quantity of the gas has been injected into a given tire to bring the same back to its rated pressure, the pressurized gas remaining in the cartridge cylinder must be discharged to the atmosphere and the cartridge then disposed of.

Another limitation of such known inflation devices resides in the fact that cartridge puncture usually is effected by the action of threading the union nipple which is associated with the device onto the valve stem of the tire or other article which is to be inflated. In an instance where the exterior screw thread on the valve stem is badly worn or defaced, thread slippage occurs and the necessary axial pressure on the puncture pin of the inflation device cannot be attained.

Some known devices of the puncturable cartridge type, instead of relying on a threaded connection between the union nipple and the valve stem of the tire to be inflated, rely on manual axial pressure for cartridge puncturing purposes. However, when a mounted bicycle tire is deflated, or nearly deflated, the necessary force required to effect the puncture of the cartridge often is adequate to push the valve stem of the tire to be inflated back into the wheel rim so that no puncture takes place.

The present invention is designed to overcome these and other limitations that are attendant upon the construction and use of conventional inflation devices of the puncturable cartridge type and, toward this end, the invention contemplates the provision of a small cylinder-like container one end of which is closed by a threaded closure cap member through which there projects in sealing relationship a plunger-type striker pin. The other end of the container is provided with a valve-equipped nipple-like fitting which is designed for threaded reception over the valve stem of the tire or other article to be inflated. A hollow tubular metering valve, which is self-seating under the influence of gas pressure, is slidable in the nipple fitting and is engageable endwise with the outer end of the valve stem for valve-unseating purposes and to allow entrapped gas within the container to be discharged through the valve stem and into the tire. Withdrawal of the nipple fitting from the valve stem of the inflated tire or other article allows the valve to return to its seat so as to conserve whatever gas may remain in the container after a given application. Pressurization of the container takes place by the simple expedient of unthreading the closure cap member, inserting a pressurized gas cartridge into the container, replacing the closure cap member, and striking the slidably mounted striker pin in order to produce impact penetration thereof through the soft metal seal of the cartridge.

The provision of an inflation device such as has briefly been outlined above constitutes the principal object of the present invention. Other objects and advantages of the invention not at this time enumerated will readily suggest themselves as the nature of the invention is better understood from a consideration of the following detailed description.

The invention consists in the several novel features which are hereinafter set forth and are more particularly defined by the claims at the conclusion hereof.

In the accompanying single sheet of drawings forming a part of this specification, one illustrative embodiment of the invention is shown.

In these drawings:

FIG. 1 is a side elevational view of an inflation device embodying the principles of the present invention;

FIG. 2 is an enlarged side elevational view of the device, largely in section and with portions of the cylinder wall broken away in order more clearly to reveal the nature of the invention; and FIG. 3 is an enlarged fragmentary sectional view taken substantially centrally and longitudinally through the front end region of the device and showing the same operatively applied to the valve stem of a tire to be inflated.

Referring now to the drawings in detail, an inflation device according to the invention is designated in its entirety by the reference numeral 10 and is comprised, in the main, of three principal parts, namely, an open-ended tubular container or shell 12 of circular cross section, a striker cap assembly 14 which closes one end of the container 12, and a nipple fitting or dispensing cap assembly 16 which closes the other end of said shell. The end of the container which is closed by the striker cap assembly 14 may be regarded as being the rear end of the device, while the end of the shell which is closed by the nipple fitting 16 may be regarded as being the forward end of the device. When the striker cap assembly 14 and the nipple fitting cap assembly 16 are in place on their respective ends of the container 12, a pressure chamber 18 is established for pressurized carbon dioxide gas which is adapted to be supplied by an internally disposed, gas-filled cartridge 20, the latter being of the type which is commonly referred to as a $CO_2$ cartridge and is commercially available in such establishments as sporting goods stores, hardware stores, and the like. The cartridge 20 consists of a steel container which is of generally teardrop design and has a tapered neck through which pressurized gas is discharged after puncture of a soft metal seal, which normally extends across the outer end of the neck of the cartridge and blocks egress of the gas.

The container 12 is of open-ended tubular construction and is preferably formed of seamless aluminum tubing although other metals are contemplated for its manufacture or fabrication. The rear end of the container is provided with an external screw thread 22, while the forward end is similarly formed with an external screw thread 24.

The striker cap assembly 14 of the inflation device 10 comprises a cup-shaped closure cap member 30 the crown portion of which establishes a closure wall 32 for the rear end of the container 12 and the skirt portion 34 of which is internally threaded as indicated at 36 for threaded reception over the external screw thread 22. The closure wall 32 has formed therein a centrally disposed axial bore 38 through which there loosely projects a striker pin 40 in axially slidable relationship. The inner end of the striker pin 40 has a reduced portion 41 and is tapered as indicated at 42 in order to provide a seal-penetrating point 44, while the outer end of said striker pin 40 is provided with a ring-like striker head 46. The latter is threadedly or otherwise fixedly received on the outer end of the striker pin 40 and seats against an annular outwardly facing shoulder 48. Immediately inwards of the reduced portion 41 of the striker pin 40 there is provided an annular flange which constitutes, in effect, a valve body or sealing flange 50 and underlies and cooperates with a frusto-conical recess 51 in an annular elastomeric sealing ring or washer 52, the frusto-conical recess 51 establishing a valve seat for the valve body 50. As shown in FIG. 2 of the drawings, the sealing ring 52 fits against the inner surface of the closure wall 32 of the closure cap member 30 of the striker cap assembly 14 and when the cap member 30 is connected to the rear end of the container 12 and the chamber 18 is pressurized, it is held in sealed or gastight relation with the inner surface of the closure wall 32 by the pressure of the gas in said chamber 18. As will be pointed out in detail presently, the flange-formed valve body 50 normally is maintained in sealing contact with the coacting valve seat under the influence of the pressure of the pressurized gas which is contained within the pressure chamber 18. The outer side of the skirt portion 34 of the striker cap 14 is longitudinally ribbed as indicated at 54 in order to facilitate gripping of the cap member 30 in connection with its application to and removal from the tubular container 12. When the closure cap member 30 is screwed fully onto the rear end of the tubular container 12, the elastomeric sealing ring is compressed as shown in FIG. 2 and thus forms a gastight seal which prevents leakage of pressurized gas from the rear end of the container.

As best shown in FIGS. 2 and 3 of the drawings, the nipple fitting cap assembly 16 comprises a cap member 60 the crown portion of which establishes a closure wall 62 for the front end of the container 12 and the skirt portion 64 of which is internally threaded as indicated at 66 for threaded reception over the external screw thread 24. If desired, the screw threads 66 and 24 may be permanently sealed together by a suitable hydraulic sealing compound such as is commercially available under the trade name "Loctite." Additionally, a flat annular sealing gasket 68 is interposed between the front rim 70 of the container 12 and the outer portion of the closure wall 62 of the cap member 60.

The cap member 60 of the nipple fitting cap assembly 16 is formed with a central counterbore 72 and a bore 74, and these establish between them as inwardly facing annular shoulder 76. This shoulder serves as an inwardly facing seat for a tubular cylindrical nipple 78. The latter extends for the most part through the bore 74 and has an internal screw thread 79 at its outer end. The inner end of the nipple is formed with an outwardly extending annular flange 80 which rests on the shoulder 76 as best shown in FIG. 3. The nipple 78 is press-fitted within the bore 74 and is permanently secured and sealed therein by a conventional locking device 82.

Slidably disposed within the nipple 78 is a composite (two-piece) valve assembly comprising an inner valve body 90 and an outer tubular abutment member 92. The latter is telescopically received over the outer end of the valve body 90 with a press fit, and thus, constitutes an outer extension of such valve body. An elastomeric O-ring 94 is disposed within an annular groove 96 in the medial region of the valve body 90 and effects a seal between the valve body and the inner cylindrical surface of the nipple 78.

The inner end of the valve body 90 is provided with an integral frusto-conical valve head 100 and the latter is surrounded by a conformably shaped annular elastomeric sealing sleeve 102. Such sleeve is designed for sealing engagement with a frusto-conical valve seat 104 which is formed at the inner rim region of the tubular cylindrical nipple 78. In FIG. 3 of the drawings, the sealing sleeve 102 is shown as being slightly raised from its associated frusto-conical valve seat 104, but it will be understood that normally the sleeve 102, as shown in FIG. 2, will be maintained seated under the influence of the pressure of pressurized gas which is contained within the pressure chamber 18 of the container 12.

The valve body 90 has formed therein a relatively deep, axially extending, bore-like socket 110, the outer end of the latter being open and in register and communication with the interior of the tubular abutment member 92. A radial port 112 is formed through the wall of the socket 110 inwardly of the O-ring 94 and establishes communication between the socket 110 and the annular space 114 which exists between the wall of the nipple 78 and the wall of the socket. An outwardly extending annular rib 116 adjacent to the small or outer end of the valve head 100 engages the outer end surface of the sealing sleeve 102 and holds the sleeve against outward dislodgment with respect to the valve body 90. An outwardly extending annular rib 117 on the large or inner end of the valve head 100 engages the inner end surface of the elastomeric sealing sleeve 102 and holds such sleeve against inward displacement with respect to the valve body 90.

As clearly shown in FIG. 2, the cartridge 20, when operatively installed within the pressure chamber 18, is adapted to have its rounded end seated on the circular inner end or rim 118 of the counterbore 72 which extends partially through the cap member 60 of the nipple filling cap assembly 16 of the device 10. An annular series of relief notches 120 is cut in this rim 118 so as to establish communication between the pressure chamber 18 and the counterbore 72 when the cartridge 20 is in its seated position on said circular rim 118 and thus prevent the smooth rounded end of the cartridge from blocking egress of pressurized gas from the pressure chamber 18 when the nipple 78 is operatively applied to a tire valve stem for inflation purposes (see FIG. 3). The longitudinal extent of the cartridge 20 is such that when the latter is thus seated on the annular rim 118, the neck portion thereof closely underlies the seal-penetrating point 44 at the inner end of the striker pin 40.

In the operation of the herein described inflation device 10, the pressure chamber 18 is charged by unscrewing the striker cap assembly 14 from the rear end of the container 12 and inserting a fresh cartridge 20 into the chamber so that its rounded end comes to rest on the circular rim 118. Thereafter, the striker cap assembly 14 is replaced on the container and screwed down tight so as to effect a gastight seal between the rear rim region of the container and the striker cap assembly. At this time, the striker pin 40, as well as the valve body 90, will have a certain amount of freedom of movement within the respective bores through which they project.

In this condition of the assembled device, and with the cartridge 20 thus installed therein, the device may be conveniently carried in the pocket of the user until such time as an emergency situation dictates that the device shall be put to use in the inflation of a tire or other article. When such a situation arises, the user will deliver an impact blow to the outer striker pin 40 by means of any convenient object of appreciable mass such as a nearby stone, board, or the like. Alternatively, the user may employ the ground or a solid portion of the bicycle or other vehicle on which the deflated tire is disposed as an impact surface for contact with the exposed outer end of the striker pin 40.

As soon as the impact blow has been imparted to the striker pin 40, the puncture point 44 penetrates the soft metal seal of the cartridge and the carbon dioxide or other gas which is contained in the cartridge is released and fills the pressure chamber 18. The pressure of this gas within the chamber 18 causes the striker pin to be automatically and substantially instantaneously retracted (slid outwards) so that the annular sealing flange seats against the valve seat which is formed by the elastomeric sealing ring 52, while at the same time the valve body 90 and its associated sealing sleeve 102 are projected axially outwardly of the chamber 18 until the elastomeric sealing sleeve 102 becomes seated on the frusto-conical valve seat 104. At this time, the pressure chamber is fully pressurized and the device is then in its "ready" condition for application to the valve stem of the tire to be inflated.

The manner in which the device is applied to a valve stem is illustrated in FIG. 3 wherein the valve stem is designated by the reference numeral 122 and includes the usual internal valve assembly which invariably embodies a valve cage 124 and a valve element (not shown) from which there projects outwardly of the cage a pressure relief stem 126. To apply the device to such a valve stem 122, the tubular nipple 78 is threaded onto the valve stem until such time as the abutment member 92 engages the outer rim of the valve stem, after which further threaded engagement between the valve stem and the nipple will shift the valve body 90 and its associated elastomeric sealing sleeve 102 from the frusto-conical valve seat 104 and allow gas to escape from the pressure chamber 18 and enter the annular space surrounding the wall of the socket 110, then pass radially inwardly through the port 112 and flow into the socket 110 and through the tubular abutment member 92 where it will cause depression of the pressure relief stem 126 and its associated valve in the usual manner of excess pressure inflation of a conventional or standard valve stem, the gas finally entering the tire to be inflated via the valve stem.

At such time as the tire is considered to be fully inflated, the nipple 78 may be unscrewed from the valve stem 122, thus allowing the sealing sleeve 102 to return to the valve seat 104 so that any gas which remains within the chamber 18 under pressure may be retained therein for future inflation of a tire.

It is well known that the volume of gas which is contained within a conventional $CO_2$ type cartridge such as the cartridge 20 is capable, when released from the cartridge into the tire of a bicycle wheel of average size, is sufficient to bring a completely deflated tire up to a satisfactory sustaining pressure on the order of from 40 to 50 pounds per square inch. Thus, where a tire is only partially deflated, a single cartridge may contain sufficient pressurized gas to service several similarly deflated tires and it is not necessary to discard a given cartridge after each such application.

The invention is not to be limited to the exact arrangement of parts shown in the accompanying drawings or described in this specification as various changes in the details of construction may be resorted to without departing from the spirit or scope of the invention. For example, it is obvious that, if desired, in order to accommodate tires of larger vehicles such as large wheel motorcycles or automobiles, the proportions of the device 10 may be increased accordingly and special cartridges of larger gas volume may be constructed for use with such devices. Therefore, only insofar as the invention is particularly pointed out in the accompanying claims is the same to be limited.

Having thus described the invention what I claim as new and desire to secure by letters patent is:

1. A device for inflating pneumatic vehicle tires of the type having exteriorly threaded valve stems, said device comprising an elongated container embodying an open-ended tubular cylindrical shell, a rear cup-shaped striker cap threadedly received over and closing the rear end of said shell and including a closure wall and a threaded skirt portion, and a similar front dispensing cap threadedly received over and closing the front end of said shell and including a closure wall and a threaded skirt portion, said container being adapted for telescopic reception therein of a cylindrical gas cartridge having a reduced puncturable neck and a rounded base with the neck being disposed in close proximity to said rear striker cap, the base being disposed in close proximity to said front dispensing cap, and the cylindrical shell confining the cylindrical side of the cartridge, a striker pin slidable centrally and axially through said striker cap and having an impact end disposed exteriorly of the container and a pointed inner end designed to puncture the neck of the cartridge when a blow is delivered to said impact end, an elastomeric sealing ring fitting against the closure wall of the striker cap through which the striker pin projects, an enlarged annular sealing flange on said striker pin interiorly of the container and designed for sealing engagement with the sealing ring under the influence of gas pressure which is developed in the container when said neck is punctured, a tubular nipple mounted on said dispensing cap and projecting through the closure wall thereof in sealing relationship and having its outer end designed for threaded reception over a tire valve stem, a valve head normally seated on and closing the inner end of the nipple, means effective when said nipple is threadedly received over the valve stem for unseating said valve head to allow gas to enter a tire through the nipple, and means on said dispensing cap providing a reaction seat for the base of the cartridge.

2. A device for inflating pneumatic vehicle tires as set forth in claim 1, wherein the closure wall of the dispensing cap is provided with a cylindrical bore through which the inner end of the nipple projects in sealing relationship and an enlarged counterbore having a circular rim on which the base of the cartridge is adapted to seat, there being a series of relief notches formed in said circular rim and establishing gas communication between the interior of the container and said counterbore.

* * * * *